: 3,033,690
Patented May 8, 1962

3,033,690
PROCESS FOR FREEZE-DRYING MUSHROOMS
James W. Tarvin, Anaco, Venezuela, and John R. Fisher, Kankakee, Ill., assignors, by direct and mesne assignments, to Armour & Company, Chicago, Ill., a corporation of Delaware
No Drawing. Filed Oct. 19, 1959, Ser. No. 847,110
3 Claims. (Cl. 99—204)

Our invention relates to a process for drying food products, more particularly to a process for freeze-drying mushrooms.

Several procedures are known for freeze-drying food products of various types. In one such procedure, the food is chilled, maintained at a vacuum of less than about 4.5 mm. Hg, maintained at a temperature below 0° C. until the product contains from about 2 to about 8% moisture, and further dried by heating to about 20° C. under vacuum. In another process, the food is frozen, placed under vacuum of less than about 0.75 mm. Hg, dried at temperatures of from about —5° to +5° C. for 8 to 12 hours to remove from 60 to 90% of the original moisture and later dried up to temperatures of 70 to 90° C. until the product is dried.

While the prior procedures are generally operative, particular freeze-dry processes must be developed for particular foods. This is especially true where the food, for example mushrooms, is discolored easily by enzymatic activity, chemical oxidation, or other change.

There are no guide posts for the researcher in this field and an empirical process for freeze-drying a particular food must be worked out by trial and error to achieve a superior product. This laborious procedure is required as the enzyme systems and chemical constituents of each food differs from other foods in little understood ways.

Freeze-dried mushrooms are generally utilized in the preparation of soups. For such uses, the mushrooms are diced into about 5 mm. dimensions. This procedure releases large amounts of intracellular enzymes which tend to discolor the product to some extent, even when the product is frozen.

We have now discovered a process for freeze-drying mushrooms which reduces enzymatic degradation and accompanying discoloration during the freeze-drying procedure and also substantially prevents product shrinkage. Generally our process comprises chilling rapidly the mushrooms to a temperature below about —20° C., placing the chilled mushrooms under vacuum below about 2 mm. Hg, and, while maintaining the vacuum zone at a pressure below 2 mm. Hg, increasing the temperature of the vacuum zone until a product temperature of 70° C. is obtained.

The freezing step can be carried out in any equipment designed to cool materials to the desired temperatures. The drying step is carried out in any suitable vacuum oven. We prefer to utilize an oven having hollow shelves and a jacket for the circulation of heat transfer agents for the heating and cooling of the vacuum zone.

In the preferred embodiment of our invention, the mushrooms are cooled rapidly to —30° C. at a rate such that there is apparently little breakdown of the cell walls within the mushrooms by the freezing of the water within the cells. Stated another way, the mushrooms are frozen about as rapidly as heat transfer within the mushroom mass will permit. The frozen mushrooms are then placed under a vacuum below about 1 mm. Hg and heated to about 85° C. When the mushrooms obtain the desired temperature, the vacuum is broken and the mushrooms are removed from the oven.

To accomplish the drying of the mushrooms, the oven is heated from room temperature to about 85° C. over a period of two hours after the desired vacuum is obtained, care being taken to insure that the vacuum remains at the desired level. This temperature is maintained until the product heats to between about 70 and 85° C. at which temperature the mushroom contains less than about 2% residual moisture by weight.

The following example more fully describes our invention, but it is not intended that our invnention be limited to the exact procedure shown, rather it is intended that all equivalents obvious to those skilled in the art be included within the scope of our invention as claimed.

A 2.1 K. portion of a light strain of Agaricus campestris mushrooms having a 3.7-7.5 cm. diameter, closed veils and light colored interior gills was diced to about 0.5 mm. dimensions, washed with cold water, and placed in a stainless steel tray. The tray of mushrooms was placed in a walk-in freezer maintained at a temperature below —30° C. and rapidly chilled to about —20° C. over a period of three hours. After chilling, the mushrooms were removed from the freezer and placed in a cooled, jacketed, drying oven. The oven was sealed and a vacuum of 1 mm. drawn with a four stage steam ejector system. After about twenty minutes the desired vacuum was obtained and water having an initial temperature of about 20° C. was circulated through the platens and jacket of the oven. Over a two hour period the temperature of the water was increased to 85° C. The product was removed from the oven when dry (after about 22 hours) and found to have an improved appearance as to shrinkage and color.

Now having described our invention what we claim is:

1. In a process for freeze-drying mushrooms, the steps comprising freezing rapidly mushrooms to a temperature lower than about —20° C., placing and maintaining the mushrooms under a vacuum of less than about 2 mm. Hg, and heating the mushrooms in a single stage until a product temperature of about 70° to 85° C. is obtained, at which temperature the mushrooms contain less than about 2% residual moisture by weight.

2. In a process for freeze-drying mushrooms, the steps comprising freezing rapidly mushrooms to a temperature lower than about —20° C., placing and maintaining the mushrooms under a vacuum of less than about 1 mm. Hg, and heating the mushrooms in a single stage until a product temperature of about 85° C. is obtained, at which temperature the mushrooms contain less than about 2% residual moisture by weight.

3. In a process for freeze-drying mushrooms, the steps comprising freezing mushrooms to a temperature of about —20° C. over about a three hour period, placing and maintaining the mushrooms under vacuum of about 1 mm. Hg, and heating the mushrooms in a single stage over about a 22 hour period to a temperature of about 85° C., at which temperature the mushrooms contain less than about 2% residual moisture by weight.

References Cited in the file of this patent
UNITED STATES PATENTS 2,765,236    Blaine _____ Oct. 2, 1956
2,899,319    Powers et al. _____ Aug. 11, 1959

OTHER REFERENCES
Food Industries, November 1943, vol. 15, pages 74–75.